Jan. 7, 1964   H. P. QUINN   3,117,272
INVERTER CIRCUIT
Filed Nov. 30, 1959

INVENTOR
HALSEY P. QUINN
BY
Eyre, Mann, & Lucas
ATTORNEYS

United States Patent Office 3,117,272
Patented Jan. 7, 1964

3,117,272
INVERTER CIRCUIT
Halsey P. Quinn, Whippany, N.J., assignor to Tung-Sol
Electric Inc., a corporation of Delaware
Filed Nov. 30, 1959, Ser. No. 856,104
2 Claims. (Cl. 321—36)

This invention relates to an inverter circuit which changes direct current power into alternating current power having a very low percentage of distortion.

Inverter circuits employing gas-filled vacuum tubes as circuit elements have ben used for some time to convert direct current power into alternating current power. The wave shape of the alternating current power approximates a square-topped wave and for many applications such a wave is undesirable and costly filter circuits must be used to reduce the distortion. In addition to the extra equipment required, there is a considerable loss in efficiency since all the components of the output wave which cause the distortion must be absorbed by the filter circuit. The present invention employs a resonant circuit as part of the output coupling transformer and this circuit produces an output wave which closely approximates a sine wave without losing any appreciable energy during the filtering action.

One of the objects of this invention is to provide an improved inverter circuit which avoids one or more of the disadvantages and limitations of prior art circuits.

Another object of the invention is to increase the efficiency of transformation from direct current to alternating current.

Another object of the invention is to reduce the weight of the circuit components necessary to produce a pure sine output wave.

Another object of the invention is to reduce the coupling between the gaseous discharge tubes and the output circuit so that wide variations of load impedance will have a minimum effect on the operation of the inverter.

The inverter circuit includes two gaseous discharge devices, each having an anode, a cathode, and a control electrode. An external oscillator circuit provides voltage pulses to the control electrodes for controlling anode-cathode conduction. The cathodes of the devices are connected together and the anodes are connected by the usual commutating capacitor. Each anode circuit includes a small inductor, a rectifier unit, and one-half of a primary winding on an output transformer. Each anode circuit is connected to a source of direct current potential in series with the usual inductor. The ends of the primary winding are connected by a second capacitor.

For a better understanding of the present invention, together with other and further objects thereof, reference is made to the following description taken in connection with the accompanying drawings.

Figure 1:
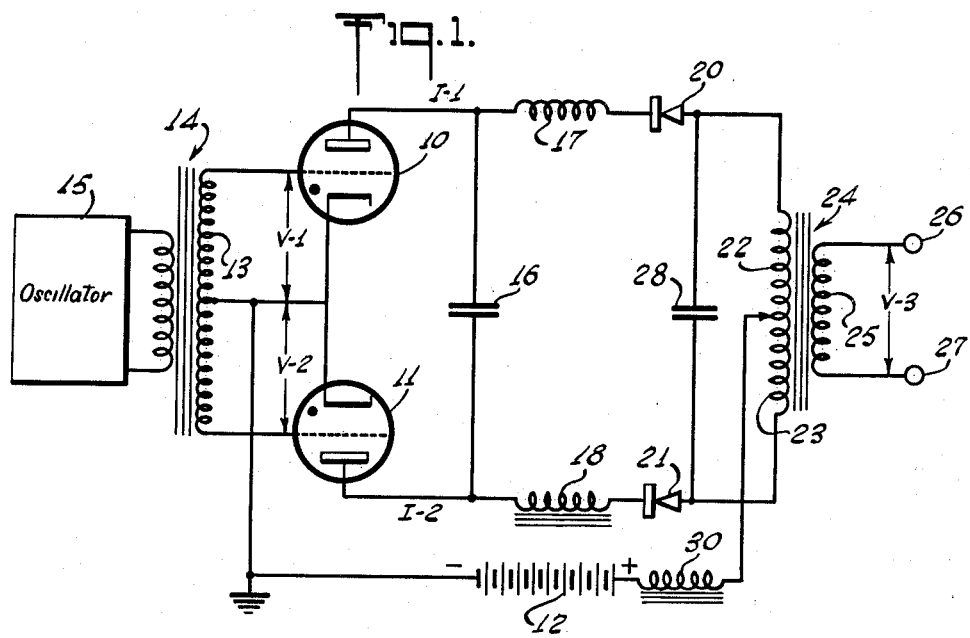
FIG. 1 is a schematic diagram of connections of the inverter circuit.

Referring now to FIG. 1, the circuit includes two electron discharge devices 10 and 11, each having a cathode, an anode, and a control electrode, surrounded by an envelope which is filled with gas at a reduced pressure. The cathodes are connected together and to the negative terminal of a source of direct current power 12. The cathodes are also connected to the mid-point of a secondary winding 13 of a transformer 14 which couples an oscillator 15 to the discharge devices. The end points of winding 13 are connected to the control electrodes of devices 10 and 11.

The anodes of the two discharge devices are connected together by the usual commutating capacitor 16 and each anode is also connected in series with a small inductor 17—18, a rectifier unit 20—21, and a half 22—23 of the primary winding of an output transformer 24. The output transformer 24 includes a secondary winding 25 which is connected to output terminals 26 and 27. In order to form a resonant circuit which helps to produce a sine wave, a capacitor 28 is connected to the end terminals of the primary winding of transformer 24. Direct current power is applied to the anodes of the discharge devices by a circuit which connects the positive terminal of power source 12 through an inductor 30 to the mid-point of the primary winding of transformer 24. The direct current power must pass through windings 22 and 23, rectifier units 20 and 21, and inductors 17 and 18 before reaching the anodes of devices 10 and 11.

The operation of this circuit is as follows: Oscillator 15, acting through transformer 14, applies positive voltage pulses to the control electrodes of the discharge devices in alternating sequence. When the direct current power is applied to the anodes, the devices are conditioned for anode-cathode conduction each time the control electrode is made positive. When discharge device 10 is made conductive, direct current flows from the direct current power source 12 through inductor 30, winding 22, rectifier 20, inductor 17, across the anode-cathode space in the discharge device, and back to the negative side of the direct current source. This action reduces the voltage drop across the anode-cathode to a low voltage (about 2 volts) and capacitor 16 is charged with its lower plate positive. During the next alternation of the oscillator 15, discharge device 11 is made conductive and its anode-cathode voltage drop is reduced to a low voltage. As soon as this action occurs, capacitor 16 discharges and in so doing reduces the potential across discharge device 10 to zero or negative so that conduction through this device is stopped. Capacitor 16 again charges but this time in a reverse direction as current flows from the direct current source through winding 23, rectifier 21, inductor 18, and the anode-cathode space in device 11. The oscillator 15 then causes device 10 to become conductive and the sequence is continued.

Figure 2:
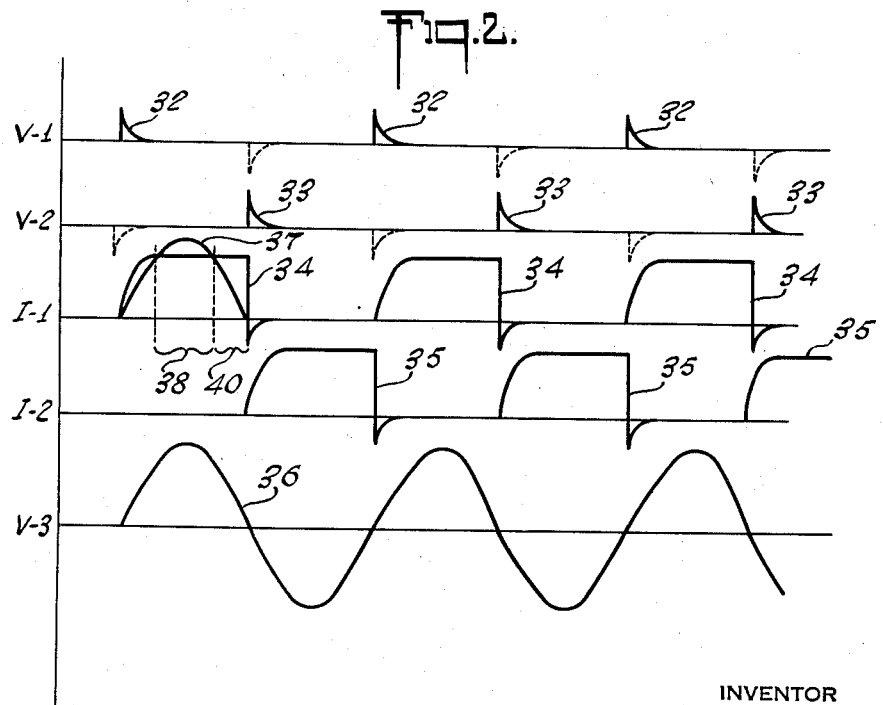
FIG. 2 is a series of graphs showing the wave forms in certain parts of the circuit.

The graph in FIG. 2 illustrates the approximate form of the positive voltage pulses 32 applied to the control electrode of discharge device 10 and the positive voltage pulses 33 applied to the control electrode of discharge device 11. As the ends of the transformer secondary winding 13 are made positive and then negative, negative pulses will also be applied to the discharge devices. These negative pulses which are shown below the zero line in dotted lines, produce no action since the discharge device is already in a nonconducting condition.

As the discharge devices are sequentially made conductive the current which flows through them alters the potential of the ends of windings 22 and 23, making them positive when the associated discharge device is nonconductive and negative when the device passes current. The alternating change of potential across windings 22 and 23 sets up an oscillating current in the resonant circuit which includes windings 22 and 23 and the parallel-connected capacitor 28. In addition, another alternating current is set up in a series circuit which includes inductor 30 and the anode-cathode circuits of the discharge devices. When device 10 is conducting, a series resonant circuit is formed which may be traced from the negative terminal of source 12, through inductor 30, winding 23, capacitor 28, rectifier 20, inductor 17, the anode-cathode circuit of device 10, and back to the source of potential. This oscillating circuit includes inductors 30, 23, and 17 and these must be adjusted so that they will combine with the other circuit components to produce resonance at the frequency of oscillator 15. These two resonant circuits combine to produce a sine wave at terminals 26, 27.

The current through the anode-cathode space of the usual inverter is shown in FIG. 2 as the square-topped output wave 34, while the similar wave through device 11 is indicated by wave shapes 35. These two waves are combined in the usual output circuit to produce a double square topped current output wave as produced by prior art inverters.

When the circit used in FIG. 1 is employed, the square topped waves are replaced by halves of sine waves resulting in the output voltage wave 36. A portion 37 of this wave is reproduced on square wave 34 to show how some of the circuit components act to produce the sine wave current and voltages at the output terminals. With the circuit of FIG. 1 in operation the leading edge of the wave is altered to a sine wave shape by the two resonant circuits as described above. At a later time interval, indicated by space 38, the end of the transformer winding 22 is more positive than the anode of device 10. At this time inductor 17 reduces the flow of current so that the wave shape 37 may be maintained at the output terminals. At a still later time, as indicated by time interval 40, the end of transformer 22 is less positive than the anode in discharge device 10 and during this time diode 20 prevents a flow of current from the output circuit to discharge device 10 to alter the shape of sine wave 37. The main function of chokes 17 and 18 is to permit the commutating capacitor 16 to drive the anodes to a voltage below zero while oscillating circuit 28—22 and 23 still presents a positive voltage to the anode circuit.

The result of the above described operations is the formation of an output voltage which is almost a pure sine wave, this wave being controlled by the two resonant circuits described above and derived from the alternate square-topped pulses 34 and 35.

The foregoing disclosure and drawings are merely illustrative of the principles of this invention and are not to be interpreted in a limiting sense. The only limitations are to be determined from the scope of the appended claims.

I claim:

1. An inverter circuit for delivering a sine wave to a pair of output terminals comprising: two gaseous discharge devices each having an anode, a cathode, and a control electrode enclosed in a sealed envelope; generating means coupled to said control electrodes for sequentially rendering the anode-cathode circuits conductive at a predetermined frequency, said generating means including an oscillator which sequentially applies a positive voltage pulse to each of said control electrodes for making the discharge devices conductive; a commutating capacitor connected betwen the two anodes; a parallel resonant circuit coupled to said output terminals, said circuit including an output inductive winding and a resonant capacitor connected in parallel and adjusted for resonance at said frequency; a series resonant circuit adjusted for resonance at said frequency and including two anode inductors, said commutating capacitor, one-half of said output inductive winding, and an inductor connected in series with the power supply; connecting means between each of the terminals with one of said anode inductors, said connecting means each including a rectifier for partially isolating the resonant currents in said series and parallel circuits; and a direct current source of power connected between a common cathode connection and a mid-point in said output inductive winding in series with said power supply inductor.

2. An inverter circuit as claimed in claim 1 wherein the inductive winding in the parallel resonant circuit is the primary of an output transformer, the secondary winding thereof being connected directly to the output terminals for delivery of sine wave alternating current power to a load.

References Cited in the file of this patent

UNITED STATES PATENTS

| | | |
|---|---|---|
| 2,159,827 | Westendorp | May 23, 1939 |
| 2,523,094 | Carleton | Sept. 19, 1950 |
| 2,689,325 | Johnson et al. | Sept. 14, 1954 |
| 2,693,535 | White | Nov. 2, 1954 |
| 2,732,499 | Bunblasky et al. | Jan. 24, 1956 |
| 2,929,013 | McNamee | Mar. 15, 1960 |